Oct. 13, 1964 E. E. STEELE, SR 3,152,829
RELEASABLE FISHING TOOL
Filed July 25, 1963 2 Sheets-Sheet 1

Elmer E. Steele, Sr.
INVENTOR.

BY *Clarence A. O'Brien*
*and Harvey B. Jackson*
Attorneys

Oct. 13, 1964     E. E. STEELE, SR     3,152,829
RELEASABLE FISHING TOOL
Filed July 25, 1963     2 Sheets-Sheet 2
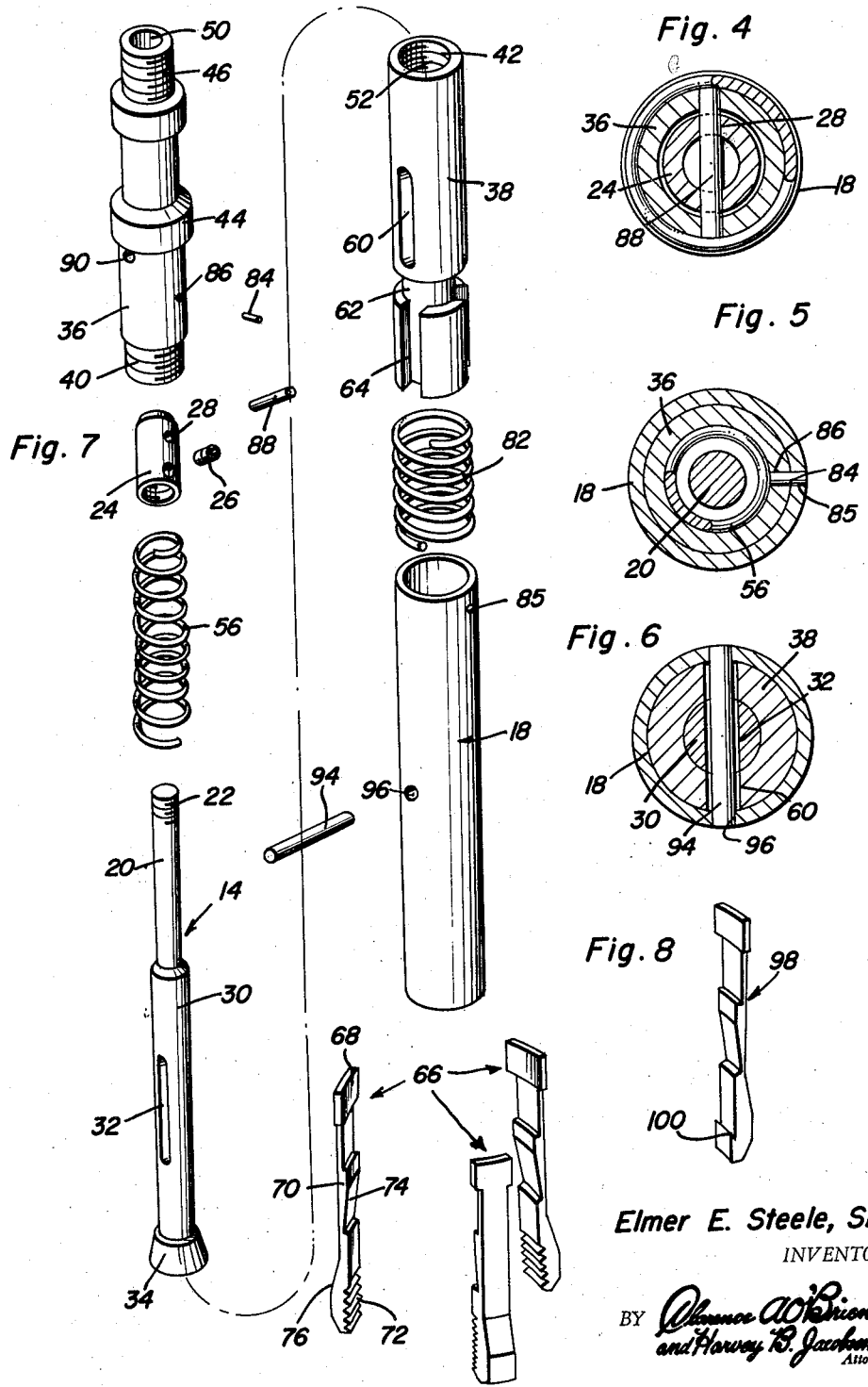
Elmer E. Steele, Sr.
INVENTOR.

United States Patent Office 3,152,829
Patented Oct. 13, 1964

3,152,829
RELEASABLE FISHING TOOL
Elmer E. Steele, Sr., 313 W. Grand Ave., Longview, Tex.
Filed July 25, 1963, Ser. No. 297,542
8 Claims. (Cl. 294—86.18)

This invention comprises a novel and useful releasable fishing tool and more particularly pertains to a fishing tool especially adapted for although not necessarily limited to wire line use.

The principal object of this invention is to provide a fishing tool from a relatively few number of parts, simple in its construction and operation and yet highly efficient in its use.

A further object of the invention is to provide a fishing tool in accordance with the foregoing objects which shall permit the use of sets of interchangeable locking dogs therewith whereby the tool may be specifically adapted for fishing different types of objects from a well bore and the like.

A still further object of the invention is to provide a fishing tool having an automatic overload release so that if the tool is incapable of pulling a fish from a well bore, the wire line or operating string may be recovered with a portion of the tool from the well bore.

A still further purpose of the invention is to provide a fishing tool in which the gripping dog shall project beyond the lower end of the tool to thereby insure a more effective gripping action of the dog upon a fish to be withdrawn from the well bore.

A still further important object of the invention is to provide a fishing tool in accordance with the preceding objects which shall include spring means for effecting closing of the tool upon a fish together with further spring means for expanding the tool to release its engagement with a fish together with shear pins operable to prevent actuation of the dog closing and the dog release springs.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURES 4-6 are horizontal sectional detail views taken substantially upon the plane indicated by the section lines 4—4, 5—5 and 6—6, respectively of FIGURE 1;

FIGURE 7 is an exploded perspective view of the tool showing its various components in disassembled relation; and FIGURE 8 is a perspective view of a modified construction of a locking dog in accordance with the invention.

Figure 1:
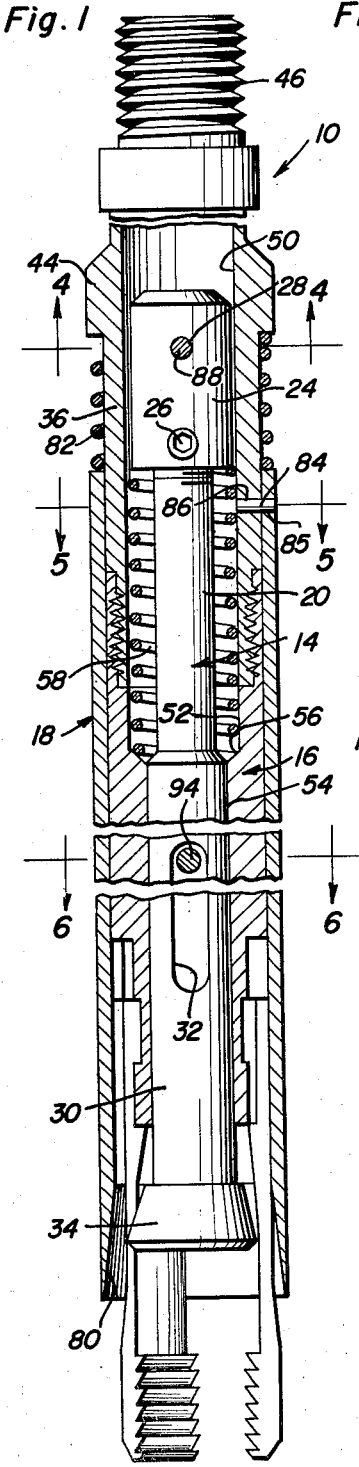
FIGURE 1 is a view in vertical longitudinal section through a preferred form of a fishing tool in accordance with this invention, parts being broken away, and showing the tool in its preliminary position in readiness for insertion into a well bore and for engagement over a fish.
Figure 2:
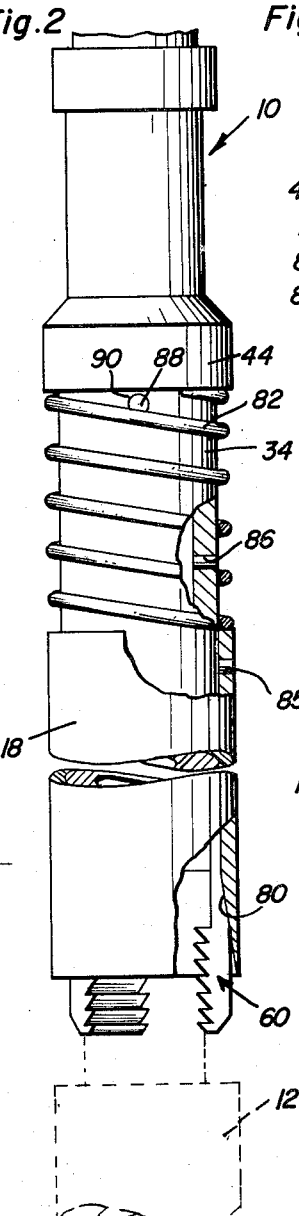
FIGURE 2 is a fragmentary view, parts being broken away and shown partly in elevation and partly in vertical section and showing the manner in which the tool is engaged upon a fish, the latter being shown in dotted lines therein.
Figure 3:
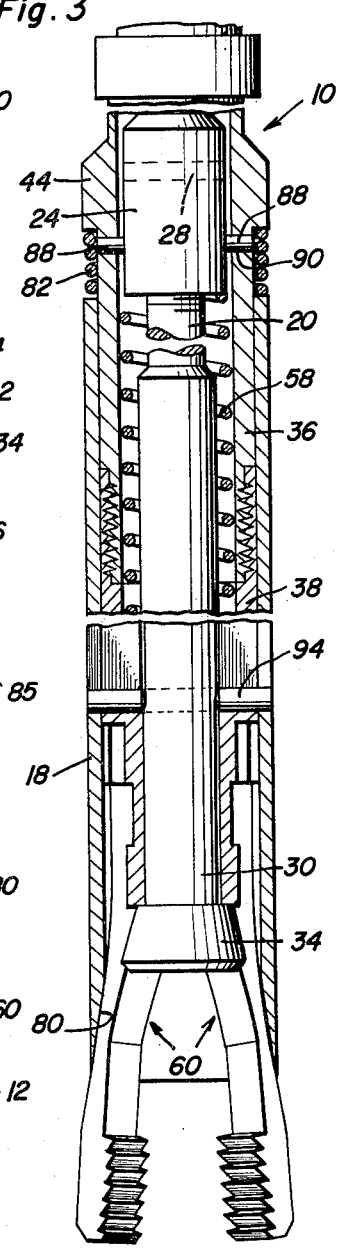
FIGURE 3 is a view similar to FIGURE 1 but showing the position of the parts of the tool when the locking dog release means has been actuated to effect disengagement of the tool from the fish in preparation for withdrawing the tool from the well bore.

In the accompanying drawings, with special reference to FIGURES 1–3, it will be observed that the numeral 10 designates generally the fishing tool of this invention which is illustrated as of the overshot type, FIGURE 2 in particular showing the manner in which the tool is engaged upon a fish 12 indicated in phantom therein for pulling the fish from a well bore.

The tool consists of a number of components, comprising the central mandrel indicated generally by the numeral 14, received within a hollow body indicated generally by the numeral 16 and which in turn is surrounded by a locking dog locking means in the form of a sleeve indicated generally by the numeral 18. With these three main components there are an associated number of specific structural elements in a manner to be now described.

The central mandrel 14, as will be apparent from FIGURES 1 and 3 in conjunction with FIGURE 7, consists of an elongated rod-like body including an upper portion 20 which is externally threaded as at 22 for the reception of a diametrically enlarged collar 24 comprising a mandrel head and which collar is threadedly engaged upon the upper portion 20 of the mandrel and is locked thereon as by a setscrew 26. The collar is provided with an aperture 28 in its upper portion for a purpose to be subsequently apparent. The lower portion of the mandrel is diametrically enlarged as at 30 and is provided with a diametrically extending vertically elongated slot 32 therethrough for a purpose to be subsequently set forth. The lower end of the mandrel terminates in a conical enlargement as at 34 comprising an actuating cam whose function is to be set forth hereinafter.

The hollow body 16 of the mandrel comprises a pair of upper and lower sections 36 and 38 having cooperating threaded portions as at 40 and 42, respectively, by which they are detachably secured together. The two sections are of cylindrical configuration having a substantially uniform external diameter except that the upper section 36 has a diametrically enlarged shoulder 44 and at its upper end has an externally threaded stem 46 adapted to be engaged by a coupling member or sub on a wire line or other operating string.

The two sections have connecting bores 50 and 52 therethrough which are in alignment with each other, with the bore of the lower section being of a reduced diameter as at 54. The junction of the two bores is formed by an annular shoulder 56 and a releasing spring 58 is housed within the bores, having its lower end resting upon and abutting upon the shoulder 56 with its upper end engaging the underside of the collar or head 24 to thereby yieldingly urge the mandrel upwardly in the body. As will be noted, the collar 24 is loosely received in the bore 50 of the upper mandrel section while the diametrically enlarged mandrel section 30 is guided and slidingly received in the reduced bore 54 of the lower mandrel section.

The lower section 38 is provided with a diametrically extending vertically elongated guiding and retaining slot 60 which is complementary to and registers with the slot 32 of the lower mandrel portion for a purpose which will be subsequently set forth. Upon its lower exterior surface, the lower section 38 is provided with a circumferentially extending annular groove 62 and a plurality of longitudinal grooves 64 intersect the annular groove and extend to the lower end of the lower section.

Removably received in these grooves and thus carried by the lower mandrel section are a set of locking dogs each indicated generally by the numeral 66. Each of the locking dogs consists of a T-shaped metal strip having a laterally extending enlarged arcuate upper cross member 68 which is thus receivable in the circumferentially extending groove 62 and a depending stem portion 70 which lies in one of the longitudinal grooves 64. The interior surfaces of the locking dogs may be of various configuration in accordance with the particular operations which they are intended to perform. As shown in FIGURE 7, the lower ends of each of these dogs is provided with teeth or serrations as at 72 for gripping or engaging the fish 12 in the manner shown in FIGURE 2. The interior surface of each dog is provided with a wedge-shaped internal cam surface 74 which is so positioned that upon relative sliding movement of the actuating cam 34 in engagement therewith, the dogs will be flexed or spread apart in the manner shown in FIGURE 3 to thus urge the dogs into their radially expanded and disengaged position from the fish. Normally, however, the dogs are so shaped that when disposed as shown in FIGURE 1, they are open sufficiently to receive therein the upper end of a fish as shown in FIGURE 2.

Upon their exterior surface, each of the dogs is provided with an external cam surface 76 which is adapted to be engaged by means to be now described whereby the dogs may be radially compressed and thus locked into the engaged position upon the fish as shown in FIGURE 2.

The dog locking means 18 consists of the generally cylindrical sleeve as shown in the drawings. At its lower end, the sleeve is provided with a tapered downwardly divergent conical locking surface in the form of a cam surface 80. The sleeve is slidably mounted upon and guided for relative reciprocation upon the exterior of the body 16 and is so disposed that when the sleeve is moved downwardly with respect to the body to a predetermined extent, the internal cam surface 80 will engage the external cam surfaces 76 of the locking dogs and compress or flex these dogs radially inwardly into the locking position shown in FIGURE 2.

In addition to the internal spring 58 there is provided an external spring 82 which surrounds the upper body section 36 and abuts against the end of the sleeve 18 and the enlargement 44 to thus yieldingly urge the locking sleeve 18 to a downward position. However, the locking sleeve 18 is retained in an upper or inoperative position upon the body sections 36 and 38 by means of a shear pin 84 which is secured in a shear pin aperture 85 at the upper end of the sleeve 18 and in a corresponding shear pin aperture 86 in the upper body section 36. Another shear pin 88 is secured in the aperture 28 in the collar 24 and in a corresponding aligned aperture 90 in the upper body section 36. In this manner the mandrel 20 is retained in its lowered position against the resistance of the release spring 58.

The pin 84 serves to retain the locking sleeve in its raised and inoperative position as shown in FIGURE 1 against the resistance of the spring 82 which tends to move the sleeve into its operative or locking dog closing position.

A third and limit pin 94 extends diametrically through the locking sleeve 18 through apertures 96 therein and through the aligned limit slots 32 and 60 of the lower mandrel portion 30 and the lower body section 38. This pin serves to retain in assembled relation the mandrel, body and locking sleeve but permits a limited reciprocation of the locking sleeve with respect to the mandrel and body and also the limited relative reciprocation between the body and mandrel.

Shown in FIGURE 8 is an alternative form of locking dog indicated generally by the numeral 98 which is provided with a hooked lower extremity 100 instead of with the serrated teeth 72 as in the preceding form. It will be appreciated that various different specific shapes and types of locking dogs may be substituted for each other interchangeably in order to adapt the two to different specific uses in recovering fish from a well bore.

The operation of the device is as follows. Normally, prior to use, the device is assembled in the manner shown in FIGURE 1 with the locking sleeve 18 being retained in its raised position by the shear pin 84 against resistance of the spring 82 and with the mandrel 14 being retained in its lower position by the shear pin 88 against the resistance of the spring 58. In this position the actuating cam 34 is in an inoperative position and the locking dogs project axially downwardly from the lower ends of the mandrel, body and locking sleeve as shown in FIGURE 1 with the dogs normally spread-apart to an intermediate position which will facilitate their passage over the fish 12 as the device is lowered into a well bore by either a wire line or a tool string or the like.

The tool is now lowered into a well bore until the open locking dogs are caused to embrace and engage the upper portion of a fish 12 to be extracted from the well bore. When this occurs, the shear pin 84 is broken as by the use of a conventional jar, not shown. Accordingly, the spring 82 is now free to urge the locking sleeve 18 downwardly and cause the internal cam surface 80 thereof to cooperate with the internal cam surfaces 76 of the locking dog 66 and readily compress the latter into locking engagement with a fish. The cable, wire line or driller or tool string may then be lifted upwardly in an attempt to withdraw the fish from the well bore. If the fish is stuck and cannot be withdrawn by the tool at this time, it is then desirable to release the tool from the fish, remove the wire line or drill string in order that the fish may be drilled out or handled in some other manner. For this purpose, the shear pin 88 which is of greater strength than the shear pin 84 is now broken. Accordingly, the spring 58 which is of greater strength than the spring 82 is now effective for forcing the mandrel 14 upwardly in the body 16 and the limit pin 94 will also retract the locking sleeve out of engagement with the locking dogs and simultaneously cause engagement of the actuating cam 34 with the internal cam surfaces 74 of the locking dogs thereby radially expanding the latter into the fully released position shown in FIGURE 3 at which time the entire tool may be disengaged from the fish.

In order to recondition the tool for further use it is merely necessary to compress the springs 58, 82 and restore the associated shear pins.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A fishing tool comprising a mandrel having an actuating cam on its lower end, a body slidably receiving said mandrel, a set of locking dogs carried by said body and projecting downwardly beyond the lower end of said body and mandrel for gripping a fish, said actuating cam being movable between a lower inoperative position and an upper, dog-engaging and dog-releasing position, a shear pin engaging said mandrel and body and retaining said actuating cam in its inoperative position, a release spring engaging said mandrel and body and urging said actuating cam into its dog releasing position, dog closing means movably mounted upon said body and movable between an inoperative position and an operative dog-engaging and locking position, a second shear pin engaging said dog-closing means and said body and retaining said dog-closing means in its inoperative position, a dog closing spring engaging said dog-closing means and said body and yieldingly urging said dog-closing means into its locking position.

2. The combination of claim 1 including a limit pin carried by said dog-closing means and slidably received in longitudinally extending aligned slots in said body and mandrel.

3. The combination of claim 1 wherein said body upon its lower exterior surface has a circumferential groove and a plurality of longitudinal grooves intersecting said circumferential groove, said locking dogs each comprising a T-shaped member having a cross member received in said circumferential groove and a stem portion received in one of said longitudinal grooves, said dog closing means including a sleeve confining said T-shaped members in said grooves.

4. The combination of claim 1 wherein said locking dogs have inner cam surfaces engageable by said actuating cam and effecting radial expansion of said locking dogs upon sliding engagement of said inner cam surfaces by said actuating cam.

5. The combination of claim 1 wherein said locking dogs have external cam surfaces, said dog-closing means having an internal locking cam surface engaging said locking dog external cam surfaces and radially compressing said locking dogs upon sliding engagement of said locking dog external cam surfaces by said dog-closing means internal cam surface.

6. The combination of claim 1 wherein said body comprises threadedly engaged upper and lower sections said release spring being disposed within said sections and surrounding said mandrel.

7. The combination of claim 6 wherein said dog closing spring surrounds said body.

8. The combination of claim 1 wherein said body comprises threadedly engaged upper and lower sections said release spring being disposed within said sections and surrounding said mandrel, said mandrel having a collar secured to its upper end, said release spring abutting said collar, said first mentioned shear pin being engaged in said body upper section and in said collar.

References Cited in the file of this patent

UNITED STATES PATENTS

| | | |
|---|---|---|
| 2,266,873 | Lang | Dec. 23, 1941 |
| 2,508,285 | Otis | May 16, 1950 |